United States Patent [19]

Jones, Jr. et al.

[11] 4,021,617
[45] May 3, 1977

[54] TELEPHONE RINGER ISOLATOR

[75] Inventors: Charles Elmer Jones, Jr., Fairfield; William Frederick MacPherson, Warren, both of N.J.

[73] Assignee: Bell Telephone Laboratories, Incorporated, Murray Hill, N.J.

[22] Filed: Jan. 12, 1976

[21] Appl. No.: 648,165

[52] U.S. Cl. .............................. 179/17 E; 179/84 A
[51] Int. Cl.² ........................................ H04M 13/00
[58] Field of Search .......... 179/17 E, 18 HB, 84 R, 179/84 A, 84 SS, 16 F

[56] References Cited

UNITED STATES PATENTS

| | | | |
|---|---|---|---|
| 3,471,651 | 10/1969 | Saia et al. | 179/84 A |
| 3,846,644 | 11/1974 | Takagi et al. | 307/252 |
| 3,848,140 | 11/1974 | Guermeur et al. | 307/252 |
| 3,916,111 | 10/1975 | Ott | 179/17 E |

FOREIGN PATENTS OR APPLICATIONS 1,487,936  8/1973  Germany .......................... 179/17 E

OTHER PUBLICATIONS

GE SCR Manual (fifth edition), "AC Phase Control", p. 231, (1972).

*Primary Examiner*—Kathleen H. Claffy
*Assistant Examiner*—Gerald L. Brigance
*Attorney, Agent, or Firm*—Robert O. Nimtz

[57] ABSTRACT

A telephone ringer isolator for isolating ringers and extending ringing range on a multiparty telephone line or for range extension only on single party lines is disclosed. The circuit includes a detector circuit for detecting the direct current superimposed on an alternating current ringing signal. A pair of biasing circuits for transistors are enabled by a properly poled ringing signal appearing between tip and ring conductors. When the transistors are enabled, a capacitor is charged to trigger a silicon-controlled rectifier. When thus fired, the silicon-controlled rectifier enables a diode bridge gate to connect the ringer between one side of the telephone circuit and ground potential. Isolation between the input and output terminals is provided by the high collector resistance of the gating transistors.

10 Claims, 6 Drawing Figures

4 PARTY FULLY SELECTIVE RINGING

2 PARTY ANI

TELEPHONE RINGER ISOLATOR

BACKGROUND OF THE INVENTION

1. Field of the Invention

This invention relates to telephone ringing circuits and, more particularly, to electronic isolating circuits for selectively operating and extending the range of the ringers on such lines.

2. Description of the Prior Art

When more than one party is connected to a telephone line, a ringer connected between one of the conductors and ground can be provided for each party. By superimposing positive or negative direct current voltages on the ringing signal and connecting this composite ringing signal between either one of the two telephone conductors and ground, four-party fully selective ringing can be provided. Gas tubes have been used to disconnect or isolate the ringer circuit from the telephone line in the absence of ringing signals. A properly poled superimposed direct current voltage, however, breaks down the gas tube to connect the selected ringer to the appropriate conductor. In doing so, however, the high voltage drop across the gas tube limits the ringing range and the number of ringers which can be connected for a single party.

Solid state switching circuits have been applied as ringer isolators to reduce the voltage drop across the connecting device. One such circuit is disclosed in H. W. Ott U.S. Pat. No. 3,916,111, granted Oct. 28, 1975, and assigned to applicant's assignee. While such circuits have been adequate to detect superimposed ringing signals under ideal conditions, they have not always worked properly when exposed to large variations in these ringing signals. These variations can be caused by induced currents from power lines or result from the characteristics (especially the crest factor) of the ringing generator itself. There is therefore a need for improved ringer isolator circuits to extend the reliable ringing range in single and multiparty telephone service and, moreover, to provide such capability at a reduced cost in comparison to what has heretofore been possible.

SUMMARY OF THE INVENTION

In accordance with the illustrative embodiment of the present invention, a ringer isolator includes a pair of detector circuits connected in series across the telephone line. Both of these detectors must normally be enabled simultaneously by the average or direct current component of the signal on the line before a capacitor can be charged to trigger a silicon-controlled rectifier and thereby connect the ringer between the ringing conductor and ground. By providing two such detectors, one operating on each side of the capacitor, and by rendering the detectors responsive to the average dc level of the ringing signal, a single isolator circuit can be used for each party in a four-party fully automatic ringing party line system.

The ringer isolator is arranged to be connected directly between the tip and ring conductors of the telephone line, poled in a direction to correspond to the desired polarity of response of the ringer. The ringer and the switch portion of the isolator are connected in series between the appropriate side of the telephone line and ground.

The ringer isolator is normally mounted outside of the subscriber premises for ease of installation and maintenance. One ringer isolator is adequate to switch all of the ringers of that party.

DETAILED DESCRIPTION

Figure 1:
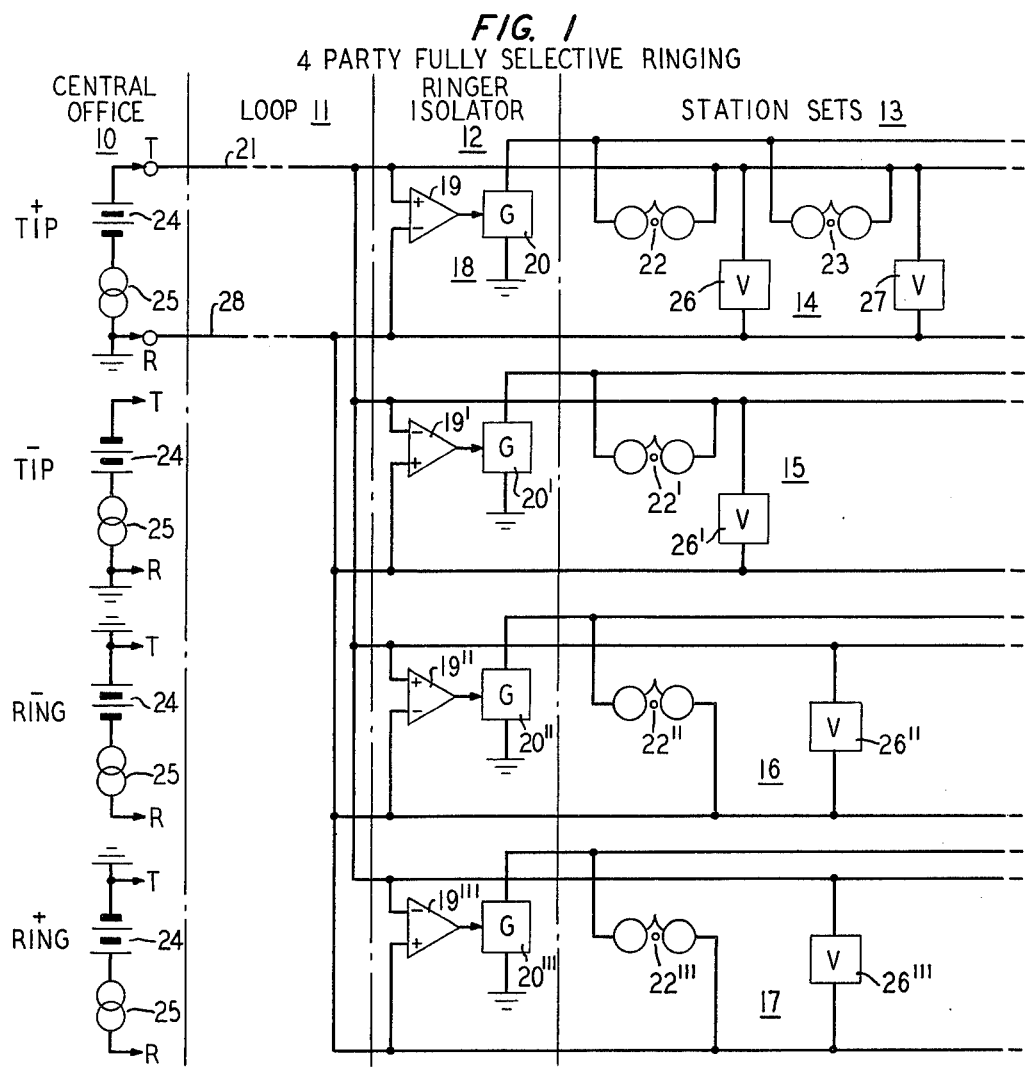
FIG. 1 is a block diagram of a four-party fully selective party line telephone system in which the present invention finds use.

In FIG. 1 there is shown a block diagram of a telephone party line system including ringing arrangements at a central office 10, a loop 11 of metallic conductor pairs for connecting the central office 10 to subscriber locations each of which include an isolator portion 12 and a subscriber telephone set portion 13. The party line telephone system includes four subscriber locations identified generally as 14, 15, 16, and 17.

At subscriber location 14 there is a ringer isolator 18 comprising a detector 19 and a gate circuit 20. Detector 19 is polarity sensitive and detects a ringing signal superimposed on a positive battery voltage connected between the tip conductor 21 and ground potential. When this voltage is detected, gate 20 is operated to connect telephone ringers 22 and 23 between the tip conductor 21 and ground potential. The superimposed ringing signal is provided from a central office battery 24 connected in series with a ringing signal generator 25.

It will be noted that ringer 22 is associated with voice circuits 26 and ringer 23 is associated with voice circuits 27. Indeed, each of subscriber locations 14, 15, 16 and 17 may include a number of extension telephones each including a ringer and corresponding voice circuits. The tip conductor 21 and the ring conductor 28 are therefore indicated as extending to the right at each of the subscriber locations 14, 15, 16, and 17.

The subscriber at location 15 is connected to be operated by a ringing signal superimposed on a negative battery (shown at the left) connected between the tip conductor 21 and ground potential. Again, ringer 22' and voice circuits 26' may be duplicated in any number of extension telephones at the subscriber location 15. Subscriber locations 16 and 17 are connected for superimposed ringing on negative and positive battery voltages, respectively, (shown at the left) but this time connected between the ring conductor and ground potential. Thus ringers 22'' and 22''' are each connected from the ringing conductor through a ringer isolator 20" or 20"', respectively, to ground potential.

Figure 2:
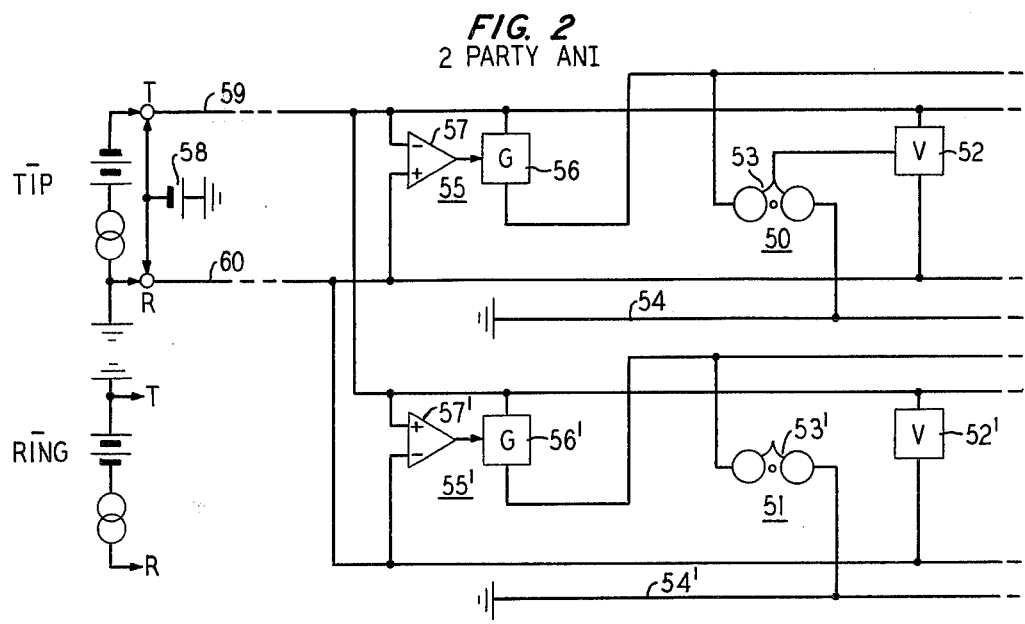
FIG. 2 is a block diagram of a two-party fully selective party line telephone system including provision for tip identification ground used in automatic number identification and in which the present invention also finds use.

In FIG. 2 there is shown a two-party telephone system providing fully selective ringing and also arranged to provide tip identification ground used in automatic number identification (ANI). The subscribers 50 and 51 in FIG. 2 correspond to subcribers 15 and 16 in FIG. 1 in that negative superimposed battery is provided to the tip and ring conductors, respectively. The ringer isolators in FIG. 2 are connected by means of four wires to the subscriber station sets. This is necessary because the tip identification ground is accomplished by connecting a balanced lead from the voice circuits 52 to the inductor of the ringer 53. One side of the inductor of ringer 53 is always grounded by lead 54 and it is this ground lead which must be brought out from the telephone set to the isolator 55. Gate 56, responding to detector 57, now connects the ringer to the tip conductor rather than to ground in order to preserve the permanent ground connection via lead 54.

Automatic number identification (ANI) is accomplished by connecting a battery 58 at the central office to both the tip and ring conductors in parallel, the other side of the battery being grounded. Any current flow to ground is taken as an indication that the tip subscriber at subscriber location 50 has initiated a call since the removal of his handset operates switchhook contacts to connect the nongrounded side of ringer 53 through voice circuit 52 to the tip and ring conductors 59 and 60. If no current flows, the caller is assumed to be the ring subscriber 51 and thus charges can be made to the appropriate party on the party line.

The present invention is concerned with ringer isolators which reliably energize the appropriate ringer and at the same time prevent unintended ringers from being erroneously energized. Unintended energization, even for brief intervals, causes undesirable "bell taps". Thus, the ringer isolators in FIGS. 1 and 2 form two different applications of the circuit arrangement to be described in connection with FIG. 6.

Figure 3:
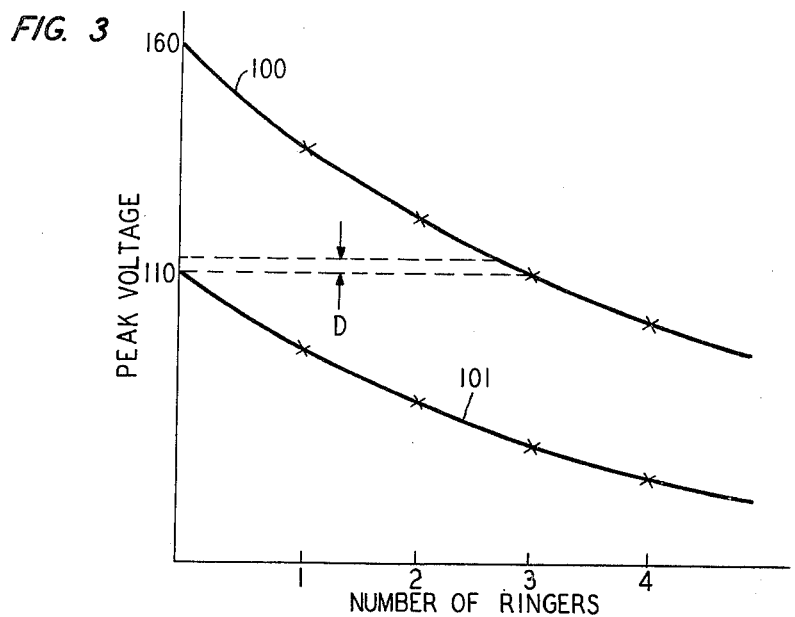
FIG. 3 is a graphical representation of the peak voltages available to operate the ringers in a party line telephone system which is useful in explaining the operation of the present invention.

Referring first to FIG. 3, there is shown a graphical representation of a peak voltage available for detection at the subscriber stations on long telephone loops having a varying number of extension phones, each including a ringer. As more ringers are connected at a subscriber location, the greater the ringing current required, the greater the voltage drop on the line, and thus the lower the voltage available at the ringer. Curve 100 is the maximum or peak ringing voltage appering at the subscriber location and poled to operate the ringers at that location. Curve 101 represents the peak voltage appearing at the same subscriber location but resulting from ringing signals (so-called "cross-ringing" voltages) intended for another subscriber. In accordance with the teachings of the prior art, it has been customary to rely on the difference between curves 100 and 101 for detecting superimposed ringing signals. That is, threshold devices have been used to detect the peak voltages which occurred when the ringing signal was superimposed on the properly poled central office direct current battery voltage. Immunity against cross-ringing was obtained by setting the threshold to exceed curve 101 and still be less than curve 100.

As can be seen in FIG. 3, this arrangement reliably separated valid ringing and cross-ringing signals for many combinations of ringers and loop lengths. On very long telephone loops, however, with the added possibility of a large number of ringers, the detection region (represented by symbol D in FIG. 3) becomes very small and, indeed, for some loops or number of ringers, disappears altogether. This would result in the ringing of unintended subscribers or failure to ring the intended subscriber. For example, FIG. 3 shows that four ringers could not be operated, and that the operation of the third ringer is marginal at best, when relying on the peak difference D.

Figure 4:
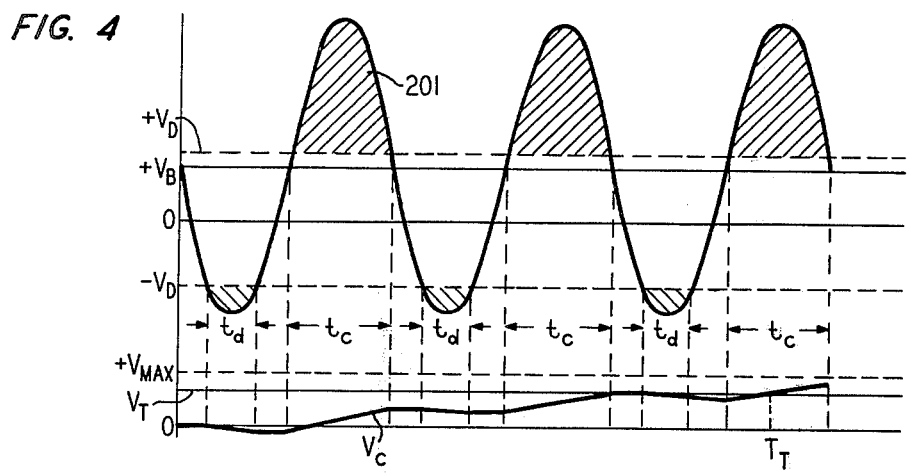
FIG. 4 is a graphical representation of a superimposed ringing signal of a proper polarity to operate the ringer isolator of the present invention.
Figure 5:
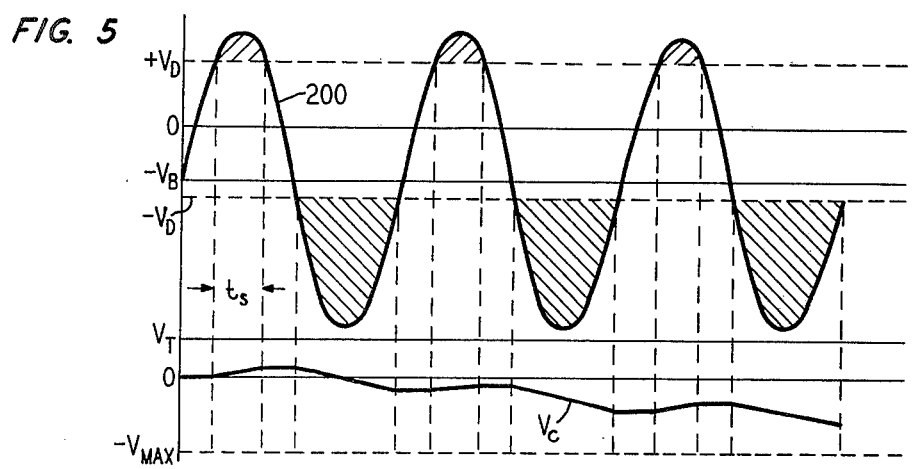
FIG. 5 is a graphical representation of a superimposed ringing signal of a polarity which is improper for the operation of the ringer isolator of the present invention.
Figure 6:
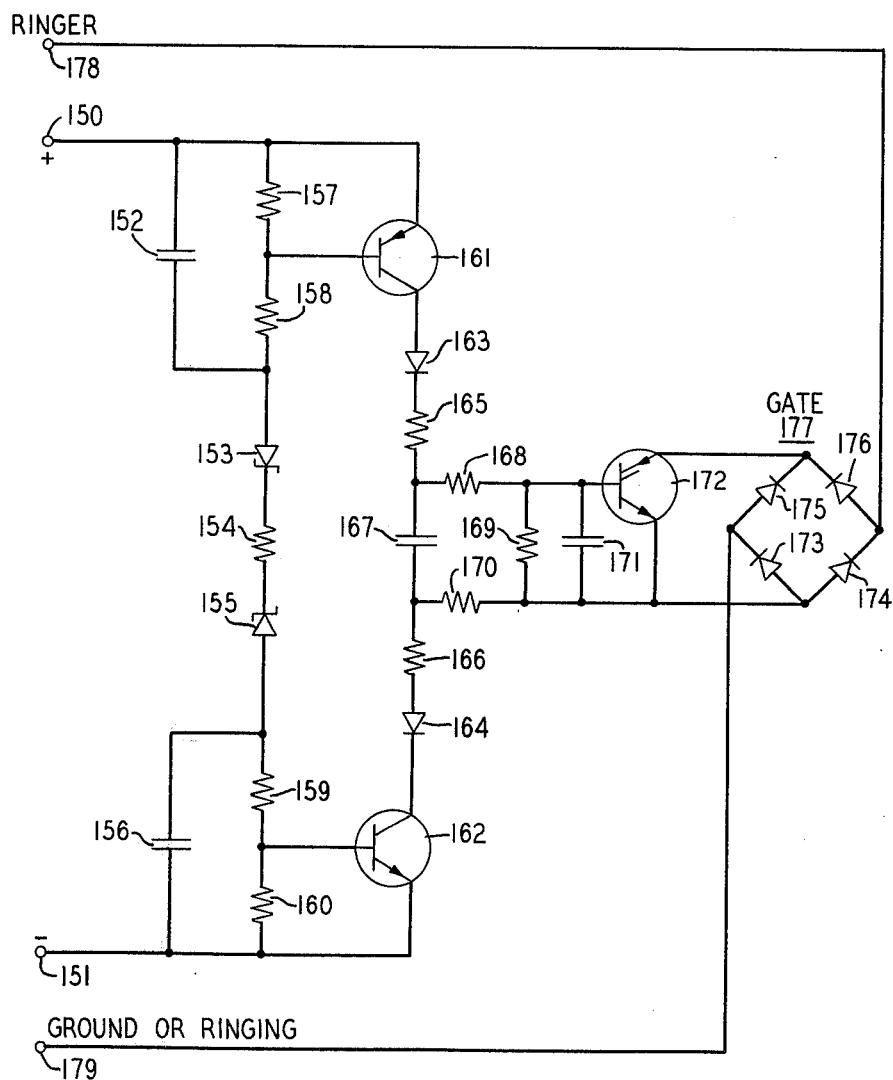
FIG. 6 is a detailed circuit diagram of a ringer isolator circuit in accordance with the principles of the present invention for use in the party line systems of FIGS. 1 and 2.

In accordance with the illustrative embodiment of the present invention, this disadvantage of the prior art arrangements is overcome by detecting the average or direct current component of the superimposed ringing signal and by not relying on the magnitude of a peak voltage to differentiate between correct ringing signals and cross-ringing signals. A circuit incorporating this principle is shown in FIG. 6. FIGS. 4 and 5 show graphical representations of superimposed ringing signals which are helpful in understanding the operation of the circuit of FIG. 6.

Referring first to FIG. 6, there is shown a ringer isolator comprising a pair of terminals 150 and 151, identified as positive (+) and negative (−) terminals, respectively, and corresponding to like identified terminals on detectors 19 and 57 in FIGS. 1 and 2, respectively. Connected in series between terminals 150 and 151 is a voltage divider circuit including capacitor 152, zener diode 153, resistor 154, zener diode 155, and capacitor 156. When the voltage between terminals 150 and 151 exceeds the breakdown voltage of either zener diode 153 or 155, current flows through this voltage divider to charge capacitors 152 and 156. It will be noted that zener diode 155 permits currents to blow in a direction from terminal 150 to terminal 151 when it is in a breakdown condition. Similarly, zener diode 153 permits currents to flow in a direction from terminal 151 to terminal 150 when it is in a breakdown region. Each of these diodes 153 and 155 has a breakdown voltage exceeding the central office battery voltage, but less than the typical peak voltage excursion of the cross-ringing signal (e.g., 56 volts). When a ringing signal superimposed on direct current is applied across terminals 150 and 151, voltages build up across capacitors 152 and 156 in the manner shown as voltage $V_C$ in FIGS. 4 and 5.

Referring first to FIG. 4, it is assumed that the ringing voltage 201 is superimposed on a positive battery $V_B$. The breakdown voltages of diodes 155 and 153 are shown as $+V_D$ and $-V_D$. As shown by the crosshatched areas, current flows through the voltage divider only when the terminal voltage exceeds $+V_D$ or is less than $-V_D$. During the periods when the composite ringing signal exceeds $+V_D$, capacitors 152 and 156 are charging. This period is indicated in FIG. 4 as the period $t_C$. When the composite ringing signal is less than $-V_D$, capacitors 152 and 156 are discharging. These periods are indicated in FIG. 4 as $t_D$. In FIG. 4, curve $V_C$ represents the voltage across capacitors 152 and 156. It can be seen that this voltage goes down during $t_D$ periods and up during $t_C$ periods. Since the period $t_C$ is longer and provides a higher potential across the terminals 150 and 151, the capacitors 152 and 156 charge at a much higher rate than they discharge. This results in the capacitor voltage $V_C$ approaching a maximum value $V_{max}$. This value of $V_{max}$ is that for which the direct current component of the composite ringing signal applied to terminals 150 and 151 is distributed equally between capacitors 152 and 156.

A voltage divider comprising resistors 157 and 158 is connected across capacitor 152. A similar voltage divider comprising resistors 159 and 160 is connected across capacitor 156. As the voltage builds up on capacitors 152 and 156, a point is reached at which transistors 161 and 162 conduct. This voltage level is indicated in FIG. 4 as $V_T$ and the transistor conduction time as $T_T$.

When transistors 161 and 162 are thus turned ON, a current flows through these transistors, through diodes 163 and 164 and through resistors 165 and 166 to charge capacitor 167. It will be noted that transistors 161 and 162 are poled to permit current flow only in a direction from terminal 150 to terminal 151. Diodes 163 and 164 insure this unidirectional current flow and thus capacitor 167 is charged only during positive excursions of ringing voltage 201 in FIG. 4. The transistors 161 and 162 provide high impedance isolation between the telephone line conductors connected to terminals 150 and 151 and the gate circuit to the right of capacitor 167.

A voltage builds up on capacitor 167 which is applied across a voltage divider including resistors 168, 169, and 170. The voltage across resistor 169, which is stabilized by capacitor 171, is applied to the gate electrode of a silicon controlled rectifier 172. When the threshold of rectifier 172 is reached, rectifier 172 fires to provide an easy current conduction path through its major electrodes and through diodes 173, 174, 175, and 176 of a diode bridge gate 177. When thus enabled, gate 177 connects terminal 178 to terminal 179. Terminal 179 can be connected to ground potential as shown in FIG. 6 for the embodiments of FIG. 1, or may be connected to a tip or ring conductor for the embodiment shown in FIG. 2. The other terminal 178 is connected to the telephone ringer.

Capacitor 171 prevents rapid changes in the gate current of the silicon-controlled rectifier 172. These changes sometimes occur under marginal triggering conditions and could cause radio frequency interference without capacitor 171.

In operation, the principal charging path for capacitor 167 is from terminal 150 to terminal 151 through transistors 161 and 162. It will be noted that this charging path does not include the inductance of the ringer and thus is not subject to the large voltage variations which occur across an inductance (the ringer coil) having a non-uniform current. These voltage variations are a principle cause of radio frequency interference in prior art isolators because they can cause unreliable and unstable triggering.

Although the circuit of FIG. 6 can be seen to operate quite satisfactorily for properly poled superimposed ringing signals, its primary virtue lies in its high resistance to improperly poled superimposed ringing signals. This condition is shown graphically in FIG. 5 where curve 200 represents a ringing signal superimposed on a negative battery voltage $-V_B$. This waveform is applied to terminals 150 and 151 in FIG. 6 when ringing another subscriber. Hence, the circuit of FIG. 6 must not respond to this voltage.

It can be seen in FIG. 5 that the crosshatched areas are again the conduction areas for zener diodes 153 and 155. The voltage $V_C$ across capacitors 152 and 156, however, tends to decrease toward $-V_{max}$ and never approaches the threshold potential $V_T$ for transistors 161 and 162. In this way, even though the circuit does respond to peak voltages of improper polarities, the detector does not charge the capacitor 167. It is necessary, of course, to choose the values of the capacitors 152, 156 and resistor 154 so that the initial charging of the capacitors during initial period $t_s$ in FIG. 5 is not sufficient to operate the transistors at their conduction potential $V_T$.

The use of the detection circuit of this invention, where one or more capacitors (152 or 156), are both charged and discharged directly by the ringing signal, and where the capacitor charging rate is sufficiently slow to prevent false detection during the period $t_s$ (FIG. 5), allows use of an unusually low detection threshold. Specifically, the threshold of the circuit of FIG. 6 occurs at about 30 volts ac superimposed on 38 volts dc. This is well below the 40 volts ac normally required to operate a ringer reliably, resulting in a ringing system wherein the range and number of ringers are limited by ringer characteristics and not by the ringer isolator characteristics. Specifically, in FIG. 3 the ringing system can be extended to a larger number of ringers where curve 100 is well below the maximum voltage of curve 101 without causing improper operation of any ringer. Another factor which increases ringing range is the small voltage drop across the silicon-controlled rectifier gate. With 86 volt ringing, the circuit of FIG. 6 permits as many as four ringers to be simultaneously rung at the end of a telephone line having a resistance of 3600 ohms.

It can be seen that the circuit of FIG. 6 is only responsive to the direct-current component or a long term average value of a superimposed ringing signal having voltage excursions exceeding the breakdown values for zener diodes 153 and 155. Very large peaks on these voltage signals due to induced voltages or other causes are unable to affect this operation and thus undesirable ringing or "bell taps" are prevented. A "bell tap" is a striking of the telephone ringer due to a temporary enablement by a transient voltage in the ringer coil.

An additional advantage of this invention results from its insensitivity to peak voltages. Some ringing generators, especially modern electronic types, have low crest factors. That is, the ratio of peak to rms voltage is less than that of a sine wave. With this invention, ringing range is essentially unaffected by low crest factors.

What is claimed is:

1. A telephone ringer isolator circuit comprising:
    a pair of terminals for receiving an alternating current signal superimposed on a direct current potential,
    a detector connected between said pair of terminals for detecting said direct current potential,
    a threshold circuit responsive to the polarity of said direct current potential for generating a trigger voltage, and
    switching means responsive to said trigger voltage for enabling said telephone ringer.

2. The telephone ringer isolator according to claim 1 wherein said detector comprises:
    a pair of oppositely poled zener diodes, and
    at least one capacitor connected in series with said diodes to be charged and discharged when said diodes break down into reverse conduction.

3. The telephone ringer isolator according to claim 1 wherein said threshold circuit comprises:
    at least one transistor turned on by said detected direct current, and a capacitor to be unilaterally charged by currents through said transistor when said transistor is turned on.

4. The telephone ringer isolator according to claim 1 wherein said switching means comprises:
a diode bridge, and
a silicon-controlled rectifier converted across said bridge to cause said diodes to conduct.

5. A telephone system comprising:
a telephone line,
one or more subscriber stations connected to said line and each including a ringer isolator circuit and at least one associated telephone ringer,
each said ringer isolator circuit comprising
bilaterally conducting means for detecting the direct current component of ringing signals on said line, and
means responsive to said detecting means for enabling the associated one of said ringers.

6. The telephone system according to claim 5 wherein said enabling means includes switching means between said ringer and ground potential.

7. The telephone system according to claim 5 wherein said enabling means includes switching means between said ringer and one of the conductors of said telephone line.

8. A telephone ringer isolator and range extender comprising
a detector for detecting superimposed ringing signals,
a capacitor,
a current-controlled charging circuit connected on each side of said capacitor and responsive to said detector for charging said capacitor,
a switch, and
means responsive to the voltage on said capacitor for closing said switch.

9. The telephone ringer isolator and range extender according to claim 8 wherein
each said charging circuit includes the collector-emitter path of a transistor.

10. A telephone ringer control circuit comprising
a ringer gate,
a voltage sensitive threshold circuit for operating said gate,
a capacitor connected to supply voltage to said threshold circuit,
a transistor isolating each side of said capacitor, and
a signal detector for enabling said transistors to charge said capacitor.

* * * * *